(12) United States Patent
Chaves Garcia et al.

(10) Patent No.: US 12,716,514 B2
(45) Date of Patent: Aug. 25, 2026

(54) PRECISION OPENING AND CLOSING MECHANISM FOR VALVES

(71) Applicants: Jordi Chaves Garcia, Barcelona (ES); Juan Miguel Chaves Garcia, Barcelona (ES)

(72) Inventors: Jordi Chaves Garcia, Barcelona (ES); Juan Miguel Chaves Garcia, Barcelona (ES)

( * ) Notice: Subject to any disclaimer, the term of this patent is extended or adjusted under 35 U.S.C. 154(b) by 219 days.

(21) Appl. No.: 18/710,121

(22) PCT Filed: Nov. 19, 2021

(86) PCT No.: PCT/ES2021/070837
§ 371 (c)(1),
(2) Date: May 14, 2024

(87) PCT Pub. No.: WO2022/223854
PCT Pub. Date: Oct. 27, 2022

(65) Prior Publication Data
US 2025/0003517 A1 Jan. 2, 2025

(51) Int. Cl.
*F16K 31/04* (2006.01)

(52) U.S. Cl.
CPC .......... *F16K 31/046* (2013.01); *F16K 31/042* (2013.01)

(58) Field of Classification Search
CPC ................. F16K 31/046; F16K 31/042; G05B 2219/45006; G05B 9/05; G05B 19/43
USPC ........................................................ 318/434
See application file for complete search history.

(56) References Cited

U.S. PATENT DOCUMENTS 4,364,111 A * 12/1982 Jocz ...................... G05B 19/23 702/41
6,382,252 B1 * 5/2002 Moore ...................... E03C 1/05 137/624.12
6,708,083 B2 * 3/2004 Orthlieb ............. G05D 23/1934 236/46 R
2009/0066281 A1 3/2009 West
2018/0142799 A9 5/2018 Dolenti et al.
2018/0187790 A1 7/2018 Schmidt

FOREIGN PATENT DOCUMENTS

WO WO2015072889 A1 5/2015

* cited by examiner

*Primary Examiner* — David Luo
(74) *Attorney, Agent, or Firm* — Albert Bordas, Esq.

(57) ABSTRACT

Opening and closing mechanism which has a power supply (1), a rotation direction setter (2), a control unit (3), which is connected to the rotation direction setter (2), a valve actuator motor (5), which is connected to the control unit in which one of the connections is for sending a BREAK instruction from the control unit (3) to the motor (5), a signal which is sent when a shutdown occurs due to over-torque inferred from the motor rotation speed. This opening and closing mechanism is not limited by any wear of the plug, has no need to use measurement of the current drawn and establishes the torque level based on measurement of the motor rotation speed, the rotation speed corresponding to the nominal torque having been previously established.

2 Claims, 1 Drawing Sheet

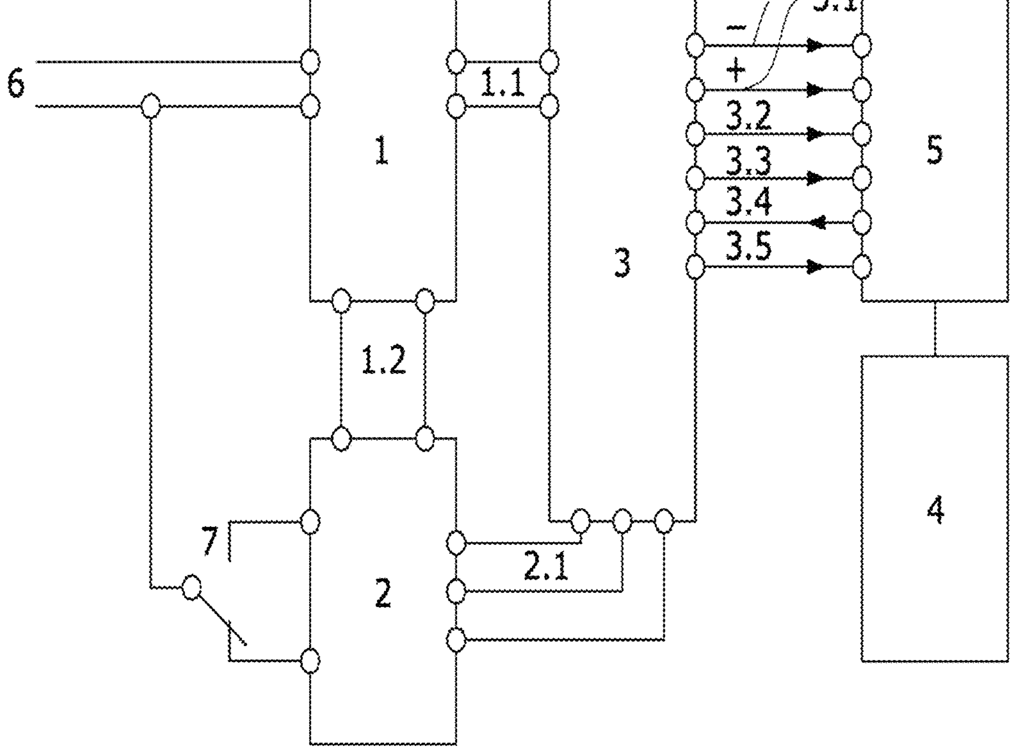
6
1
1.1
1.2
2
2.1
3
3.1
−
+
3.2
3.3
3.4
3.5
5
4
7

PRECISION OPENING AND CLOSING MECHANISM FOR VALVES

SUBJECT MATTER OF THE INVENTION

The subject matter of this invention, as established by its title, is a precision opening and closing mechanism for valves that control the supply of different fluids, a particular feature of which is the fact that the precision opening and closing is carried out on the basis of measurement of the motor rotation speed and not the current drawn.

This invention is characterised by its particular design and configuration and the fact that it uses measurement of the motor rotation speed as the signal to identify whether the valve closing seat has reached its limit switch.

This invention therefore falls into the field of valve opening and closing control mechanisms on the one hand, and, on the other, the field of valve actuator protection.

INVENTION BACKGROUND

A valve is a movable device which enables a circulation path to be opened and closed in order to permit, prevent or control the flow of fluids.

It is very important to proceed with precision when opening and closing valves, in order to ensure that the plug is positioned in a way which achieves the intended purpose, be it opening or closing.

There have thus far been a variety of opening and closing control systems. Firstly, there are stroke limiters. These are devices which, fitted in combination with valve close actuators, enable it to be determined when the actuator should be shut down due to it having reached the limit switch and, consequently, having supposedly proceeded to open and close the plug.

These systems, which control the opening and closing and therefore limit the movement of the plug, have the disadvantage that any changes due to wear of the actuator or geometric changes in the seat are not picked up by the limit switch. In other words, the plug, irrespective of its state, including any wear or subsequent structural changes, always closes in the same place because the limit switch is not sensitive to possible changes in the plug. This could mean that over time the plug may become more worn and require more turns to close properly; something which would not be possible because the position of the limit switch would need to be modified.

There are other valve opening and closing control systems based on the use of an electronic torque limiter for valve actuator motors.

An electronic torque limiter is a component which is incorporated into the electric control panel in order to prevent possible breakdowns caused by mechanical overstressing.

The function of the torque limiter is to constantly monitor the nominal current drawn by the electric motor and, if a pre-established value is surpassed, to automatically disconnect the motor.

If a certain current is surpassed, the torque limiter will come into operation, as the nominal current drawn by the motor will be in excess of the pre-established value. The motor will therefore be electrically disconnected to prevent any problems or further damage. The torque limiter could also warn us with a signal that would enable us to solve the problem prior to starting up again.

Although the torque protection systems used to date achieve the intended purpose, they are complex and require measurement of the current at all times. Moreover, they are not as accurate as they could be, and are prone to fluctuations or variations which mean that the protection is not as effective as it should be.

The purpose of this invention is therefore to overcome the aforementioned disadvantages of valve actuator control methods, in particular the travel of the valve plugs, through the development of an opening and closing mechanism which is not limited by any wear of the plug or changes in the valve geometry and meets the required level of precision. A precision valve opening and closing mechanism had thus been developed as described below and its essential elements are set out in claim one.

INVENTION DESCRIPTION

The essential elements of the subject matter of this invention are set out in the independent claim. The different embodiments are then set out in the dependent claims.

The subject matter of this invention is a precision opening and closing mechanism for valves which is comprised of the following:

- A power supply powered from the mains which supplies 24V AC in order to power both a valve actuator motor and the other modules of the mechanism.
- A rotation direction setter powered from the power supply, which has an opening and closing switch at the inlet and is connected to a control unit at the outlet.
- The control unit which is powered from the power supply receives signals from the rotation direction setter. This control unit is configurable and responsible for giving and receiving instructions from the valve actuator motor to ensure the proper functioning of the system. It is therefore connected to the motor itself and to a mechanical reducer.
- The mechanical reducer positioned at the motor outlet.

The connections between the control unit and the valve actuator motor are comprised of the following:

- Two power connections
- An on-off connection
- An opening and closing connection
- A connection in which the motor informs the control unit of the speed at which it is rotating
- A connection for the control unit to inform the motor that a shutdown has occurred due to over-torque inferred from the motor rotation speed The control unit receives the rotation direction information and transmits it to the motor, also transmitting the start-up of the motor. The motor will stop in the position indicated to it by the limit switches which are included in the mechanical module.

When the shutdown takes place due to over-torque inferred from the motor rotation speed, the control unit cuts the ON signal and sends a BREAK order.

The mechanism enables torque protection in a valve actuator motor without the need to use measurement of the current drawn, making use of the systems that the motors already have in place to control the speed, and establishing the torque level based on measurement of the motor rotation speed. The rotation speed corresponding to the nominal torque has therefore been previously established so that when there is over-torque, the rotation speed is decreased. This makes it possible to infer that there is over-torque, thus achieving torque protection for motors which is effective, simple and highly economical, as it does not require any wiring.

Unless indicated otherwise, all the technical and scientific elements used in this report will have the meaning that would usually be understood by a typical expert in the technology to which this invention belongs. In the implementation of this invention, procedures and materials similar or equivalent to those described in the report may be used.

Throughout the description and the claims, the world "comprises" and its variants are not intended to exclude any other technical characteristics, additions, components or steps. For experts in the field, other purposes, advantages and characteristics of the invention may be inferred in part from the description and in part from implementation of the invention.

EXPLANATION OF THE FIGURES

In order to supplement the description provided and to enable a better understanding of the characteristics of the invention, in accordance with a preferred example of practical embodiment, attached as an integral part of the description is a set of diagrams which, for illustration purposes only, represent the following:

In FIG. 1, we can see a general outline for the connections of the modules that form part of the precision opening and closing mechanism for valves.

PREFERRED EMBODIMENT OF THE INVENTION

Based on the attached FIGURES, the preferred embodiment of the proposed invention is described below.

In FIG. 1, we can see that the precision opening and closing mechanism for valves is comprised of the following:

- A power supply (1) powered from the mains (6) which is responsible for generating a voltage of 24V AC in order to power the other modules.
- A rotation direction setter (2) which receives power from the power supply (1) by means of a power connection (1.2). The rotation direction setter (2) has an opening and closing switch (7) at the inlet which is connected to an input power phase
- A control unit (3) which receives power from the power supply (1) by means of a power connection (1.1) and is connected to the rotation direction setter (2) by means of three connections (2.1). The control unit is configurable and responsible for giving and receiving the instructions from the motor, as well as ensuring its proper functioning.
- An actuator motor (5) which is connected to the control unit, specifically by means of:
  - Two primary power connections (3.1)
  - A third connection (3.2) to send an instruction from the on-off control unit to the motor (5)
  - A fourth connection (3.3) to send an opening/closing instruction from the control unit (3) to the motor (5)
  - A fifth connection (3.4) to send the rotation revolutions of the motor (5) to the control unit
  - A sixth connection (3.5) to send a BREAK instruction from the control unit (3) to the motor (5), a signal which is sent when a shutdown occurs due to overtorque inferred from the motor rotation speed values
- A mechanical reducer (4) connected mechanically to the motor shaft (5).

Having sufficiently described the nature of the invention, as well as the way in which it is to be implemented, it should be noted that the essential elements of the invention may be implemented in other embodiments with details that differ from those given in the example, while still falling within the scope for which protection is sought, provided that they do not alter, change or modify its basic principles.

The invention claimed is:

1. Precision opening and closing mechanism for valves comprising:

- A power supply (1) powered from the mains (6) which is responsible for generating a voltage of 24V AC in order to power the other modules;
- A rotation direction setter (2) which receives power from the power supply (1) by a power connection (1.2), the rotation direction setter (2) has an opening and closing switch (7) at the inlet which is connected to an input power phase;
- A control unit (3) which receives power from the power supply (1) by a power connection (1.1) and is connected to the rotation direction setter (2), the control unit is configurable and responsible for giving and receiving the instructions from the motor, ensuring its proper functioning;
- A valve actuator motor (5) which is connected to the control unit, specifically by means of:
  - Two primary power connections (3.1)
  - A third connection (3.2) to send an instruction from the on-off control unit to the motor (5)
  - A fourth connection (3.3) to send an opening/closing instruction from the control unit (3) to the motor (5)
  - A fifth connection (3.4) to send the rotation revolutions of the motor (5) to the control unit
  - A sixth connection (3.5) to send a BREAK instruction from the control unit (3) to the motor (5), a signal which is sent when a shutdown occurs due to overtorque inferred from the motor rotation speed;
- A mechanical reducer (4) connected mechanically to the shaft of the motor (5).

2. Precision opening and closing mechanism for valves according to claim 1 which is characterized by the control unit (3) being connected to the rotation direction setter (2) by means of three connections (2.1).

* * * * *